(12) United States Patent
Man

(10) Patent No.: US 7,880,934 B2
(45) Date of Patent: Feb. 1, 2011

(54) METHODS AND APPARATUS FOR WATERMARKING DIGITALLY PRINTED DOCUMENTS

(75) Inventor: Lai Chee Man, San Mateo, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 518 days.

(21) Appl. No.: 11/952,084

(22) Filed: Dec. 6, 2007

(65) Prior Publication Data

US 2008/0088881 A1    Apr. 17, 2008

Related U.S. Application Data

(62) Division of application No. 10/318,547, filed on Dec. 12, 2002, now Pat. No. 7,307,761.

(51) Int. Cl.
*H04N 1/405* (2006.01)
(52) U.S. Cl. .................................. 358/3.28; 358/3.19
(58) Field of Classification Search ................ 358/3.28, 358/1.9, 2.1, 3.2, 3.06–3.09, 3.19; 347/107
See application file for complete search history.

(56) References Cited

U.S. PATENT DOCUMENTS

| | | | |
|---|---|---|---|
| 3,802,724 A | 4/1974 | Gosnell | |
| 4,210,346 A | 7/1980 | Mowry, Jr. et al. | |
| 4,341,404 A | 7/1982 | Mowry, Jr. et al. | |
| 4,351,547 A | 9/1982 | Brooks, II | |
| 4,579,370 A | 4/1986 | Corwin et al. | |
| 5,149,140 A | 9/1992 | Mowry, Jr. et al. | |
| 5,171,040 A | 12/1992 | Orndorff | |
| 5,197,765 A | 3/1993 | Mowry, Jr. et al. | |
| 5,340,159 A | 8/1994 | Mowry, Jr. | |
| 5,374,976 A | 12/1994 | Spannenburg | |
| 5,403,040 A | 4/1995 | Mowry, Jr. et al. | |
| 5,487,567 A | 1/1996 | Volpe | |
| 5,538,290 A | 7/1996 | Diamond | |
| 5,641,183 A | 6/1997 | Diamond | |
| 5,735,547 A | 4/1998 | Morelle et al. | |
| 5,785,353 A | 7/1998 | Diamond | |
| 5,788,285 A | 8/1998 | Wicker | |
| 5,790,703 A | 8/1998 | Wang | |
| 5,823,576 A | 10/1998 | Lambert | |
| 5,853,197 A | 12/1998 | Mowry, Jr. et al. | |

(Continued)

FOREIGN PATENT DOCUMENTS

EP    0721849 B1    8/1995

*Primary Examiner*—Thomas D Lee
*Assistant Examiner*—Stephen M Brinich
(74) *Attorney, Agent, or Firm*—Michael A. Glenn; Glenn Patent Group

(57) ABSTRACT

A form of stochastic random distribution is used to print an invisible watermark using a typical, e.g., 600 dpi, printer. The watermark contains such information as "Do Not Copy," or other such information. Although the watermark is not visible on a first generation version of a document that is printed, various techniques are used to print the watermark in such a way that it becomes readily apparent when the first generation document is photocopied. The preferred embodiment of the invention is concerned with a technique for improving such techniques, for example so that gray levels are improved to address variations from printer to printer. Another preferred embodiment of the invention is also concerned with a technique for performing error diffusion watermarking without the need for performing a calibration step.

7 Claims, 4 Drawing Sheets

U.S. PATENT DOCUMENTS

| | | |
|---|---|---|
| 5,954,368 A | 9/1999 | Mowry, Jr. |
| 6,000,728 A | 12/1999 | Mowry, Jr. |
| 6,039,357 A | 3/2000 | Kendrick |
| 6,050,607 A | 4/2000 | Mowry, Jr. |
| 6,095,425 A | 8/2000 | Mowry, Jr. |
| 6,139,066 A | 10/2000 | Mowry, Jr. et al. |
| 6,305,718 B1 | 10/2001 | Kendrick |
| 7,104,709 B1 | 9/2006 | Maher et al. |
| 2003/0210419 A1 | 11/2003 | Reese et al. |

METHODS AND APPARATUS FOR WATERMARKING DIGITALLY PRINTED DOCUMENTS

REFERENCE TO RELATED APPLICATIONS

This application is a division of U.S. patent application Ser. No. 10/318,547, filed 12 Dec. 2002, now U.S. Pat. No. 7,307,761, which is incorporated by reference herein in its entirety.

BACKGROUND

The invention relates to printing. More particularly, the invention relates to a method and apparatus for printing warning or security watermarks, in some cases without the need for calibration.

It is desirable to prevent unauthorized copying or use of printed information. Yet the widespread availability of photocopiers make policing such copying and use extremely difficult.

Matched Clustered-Screen Watermarking

One technique that is known for identifying unauthorized copies of original printed material is known as matched clustered-screen watermarking. In matched clustered-screen watermarking, which is primarily intended for press printing, the watermark consists of large warning words of light intensity camouflaged by a background of equal intensity. The foreground, i.e. that portion containing the warning words, is printed using simple cluster-dot screening at 60 to 100 lines-per-inch (lpi) resolution. A screen at this resolution is readily reproduced by available photocopiers. The background is printed using a cluster-dot screen with a typical lpi of 120 or higher. As a result, the dots are smaller but much closer to one another in the background than in the foreground. When the dot spacing is small enough, the optical and digital processing system of typical photocopiers is not able to reproduce the dots reliably. This discrepancy in reproducibility between the foreground and the background translates to a difference in their perceptual intensity, thus rendering the warning words easily visible on the photocopy.

Matched cluster-screen watermarking works well on the press because of several fine tuning means available, e.g., control of ink intensity on the analog press, and manipulation at very high resolution (typically 2400 dots per inch (dpi)) on the digital press. However, these fine tuning means are not visible on ordinary desktop printers (typically 600 dpi, 1-bit per pixel). As a result, when strict cluster screens are used, there are relatively few background levels to choose from, i.e. the requirement of small average dot spacing, i.e. greater than 100 lpi, limits the number of intensity levels that can be achieved on a typical 600 dpi printer, e.g., at 120 lpi there are only 26 possible intensity levels. As a result, an exact match between the foreground and background intensities may not be possible and the watermark cannot be made invisible easily.

Also, the relatively low resolution available limits the number of clustered screen patterns achievable in the foreground and in the background, so that screen mismatches at the boundary between foreground and background may not be easily masked away by changing screens. As a result, there is higher chance that this objectionable boundary is perceived by the casual viewer.

It would be desirable to provide a method and apparatus that allowed the easy matching of background and foreground intensity in typical, e.g., 600 dpi, printers, such that a watermark could be made invisible in an authorized, printed copy of a document, but would become apparent in any photocopies that are made of the printed version of the document. It would also be desirable to provide a method and apparatus for watermarking that did not require a calibration step.

SUMMARY

A distribution of lines or dots is used to print an invisible watermark using a typical, e.g., 600 dpi, printer. The watermark contains such information as "Do Not Copy," or other such information. Although the watermark is not visible on a first generation version of a document that is printed, various techniques are used to print the watermark in such a way that it becomes readily apparent when the first generation document is photocopied. A preferred embodiment of the invention is concerned with a technique for improving such techniques, for example so that gray levels are improved to address variations from printer to printer. Another preferred embodiment of the invention is concerned with a technique for performing watermarking without the need for performing a calibration step.

In the preferred embodiment, a mixed format watermark is defined between a printed random error diffusion or stochastic region and a printed conventional halftone or cluster dot region. The mixed format watermark comprises a warning word or other information defined by or between the regions, comprising such information as "Copy." Although the mixed format watermark is not visible on a first generation version of a document that is printed, the warning words become readily apparent when the document is photocopied, due to differences in reproducibility between the regions in the original document. The mixed format watermark is preferably calibrated to optimize the camouflage of the warning word, in which intensities or gray levels between the printed random error diffusion or stochastic region and the printed conventional halftone or cluster dot region are balanced, such as to address variations from printer to printer. In an alternate watermark embodiment, a plurality of uniform and non-uniform line screen regions are used to define a watermark, in which differences in reproducibility between the uniform line screen region and the non-uniform line screen region expose information in a non-original document.

DETAILED DESCRIPTION

Figure 1:
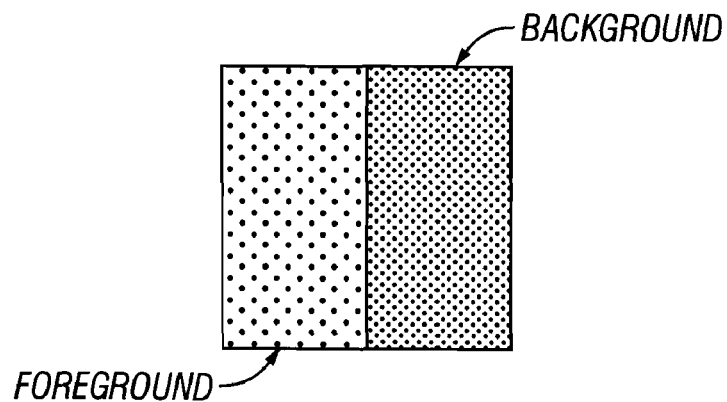
FIG. 1 is a diagram showing an exemplary matched-clustered screen for watermarking.

A distribution of lines or dots is used to print an invisible watermark using a typical, e.g., 600 dpi, printer. The watermark contains such information as "Do Not Copy," or other such information. Although the watermark is not visible on a first generation version of a document that is printed, various techniques are used to print the watermark in such a way that it becomes readily apparent when the first generation document is photocopied. A preferred embodiment of the invention is concerned with a technique, for example where gray levels are improved to address variations from printer to printer. To ensure that the foreground and background have the same perceptual intensity in the original covert watermark, so that the warning words are invisible upon casual inspection, a calibration step must be performed before the watermark is printed on any particular printer. This calibration step consists of printing the same foreground against patches of background of varying intensities. The user chooses the patch for which the foreground is most invisible against the background as the final background intensity to be used in the watermark. An important advantage of using error diffusion/stochastic screening for the background is that they allow very fine-tuning of the background intensity level while maintaining a small average dot spacing. Another preferred embodiment of the invention is concerned with a technique for performing watermarking without the need for performing a calibration step.

Stochastic Screen Watermarking

The preferred embodiment of the invention makes use of large regular cluster-dots for foreground (background) screens and small randomly distributed dots for background (foreground) screens. This is contrasted with the matched clustered-screen watermark technique where both foreground and background are composed of regular cluster-dots. The advantage of using stochastic screens is that they allow very fine-tuning of the background intensity level while maintaining a small average dot spacing.

A stochastic screen allows fine tuning of gray levels up to plus or minus one single pixel, while maintaining a low average dot spacing. This is contrasted with regular cluster dot screens at high lines per inch (low dot spacing), where between white and solid black, they are only very gray levels. Moreover, the use of a stochastic dot pattern helps to confuse the eye more, such that boundary mismatches between the foreground and background is less visible. If further masking of this boundary is desirable, the foreground can also be printed stochastically (although still with large, well-separated dots).

To ensure that the foreground and background have the same perceptual intensity in the original covert watermark, so that the warning words are invisible upon casual inspection, a calibration step must be performed before the watermark is printed on any particular printer. This calibration step consists of printing the same foreground against patches of background of varying intensities. The user chooses the patch for which the foreground is most invisible against the background as the final background intensity to be used in the watermark. An important advantage of using error diffusion/ stochastic screening for the background is that they allow very fine-tuning of the background intensity level while maintaining a small average dot spacing.

Figure 2:
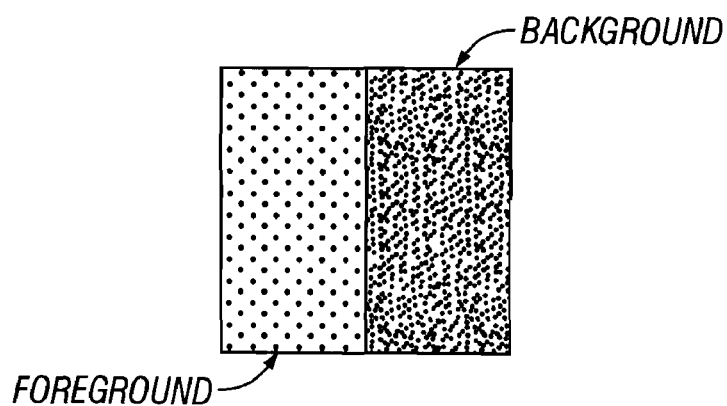
FIG. 2 is a diagram showing an exemplary stochastic screen for watermarking according to the invention.
Figure 3:
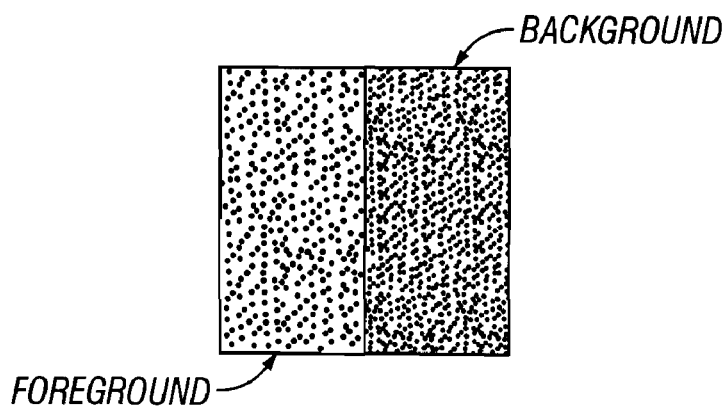
FIG. 3 is a diagram showing an alternative exemplary stochastic screen for watermarking according to the invention.

FIGS. 1, 2, and 3 show the difference between matched clustered-screen watermarking (FIG. 1) and stochastic screen for watermarking (FIGS. 2 and 3). With regard to this invention, it is important to note the following:

- Either of the foreground screen or background screens may be stochastic;
- Both of the foreground or background screens may be stochastic, although one of the screens uses larger clustered dots with wider spacing between the dots; and
- A stochastic threshold screen may be replaced with other stochastic methods, such as error diffusion.

Watermarking Without Need For Calibration

If a calibration process is not desirable, then there is another preferred embodiment where the foreground and background are automatically self-calibrated, although this new method may limit the intensity of the watermarking to only a few possibilities.

Figure 4:
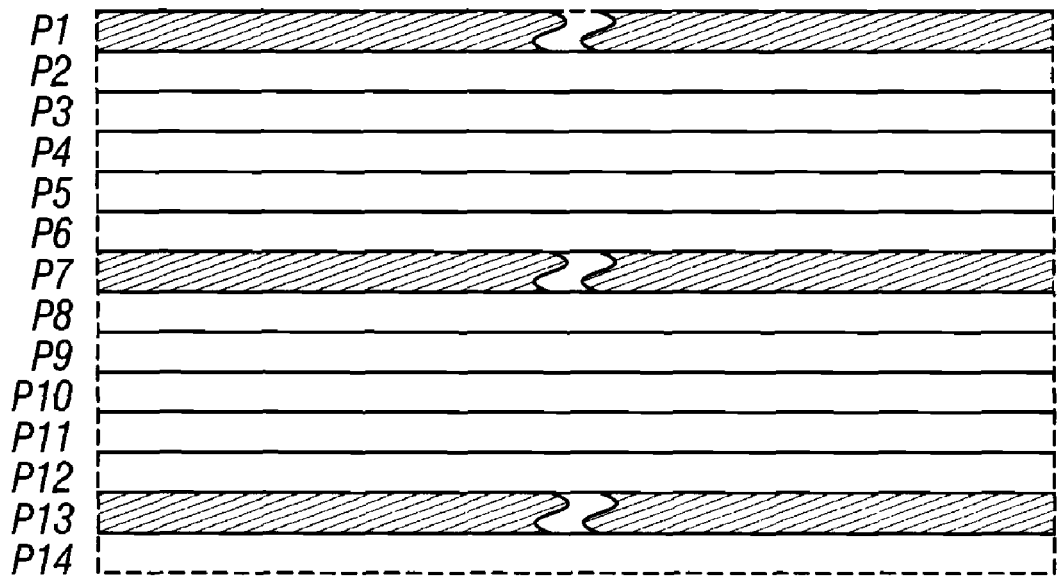
FIG. 4 is a diagram showing an exemplary background line spacing according to the invention.

In this embodiment of the invention, both the foreground and the background are printed using line screens at the same angle. In the exemplary embodiment of the invention the lines are preferably one pixel wide, but with different spacing between them. In the background (see FIG. 4), all the lines are equally spaced substantially at 100 lpi or below, e.g., on a 600 dpi printer, and the invention puts down one horizontal line of ink for every six rows of pixels, i.e. a constant spacing of five pixels, achieving 100 lpi, which can be accurately reproduced on a photocopy machine.

Figure 5:
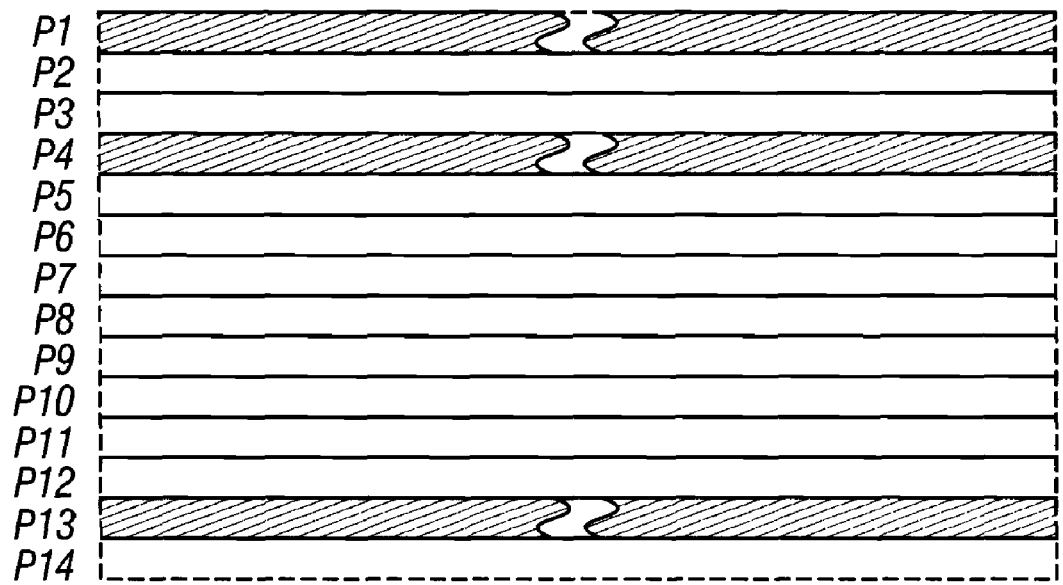
FIG. 5 is a diagram showing an exemplary foreground line spacing according to the invention.

In the foreground (see FIG. 5), the line spacing alternates between two or more values, one very small and the other larger, such that the average spacing in the foreground is the same as in the background, and therefore both have the same average intensity. In this example, one can choose spacing of two and eight pixels on a 600 dpi printer. The two lines spaced two pixels apart are not reproducible on a typical photocopier. In general, the space between these lines is filled up by ink in the photocopy. This discrepancy in reproducibility between the foreground and the background again translates to a difference in their perceptual intensity, thus rendering the warning words easily visible on the photocopy. It will be appreciated by those skilled in the art that the manner in which the background and foreground spacing is achieved is accomplished by techniques well known in the art. For example, a background with spacing of seven pixels apart, foreground at two, and twelve pixels apart. It will also be appreciated by those skilled in the art that the line spacing described above are provided only for purposes of example and that the invention is readily practiced with other line spacing. Key to the invention is the use of constant and reproducible line spacing in the background and variable line spacing in the foreground, such that there is a variance between the foreground and background in perceptual intensity upon copying.

One reason for choosing line screens in the preferred embodiment of the invention is for reduced variability between printers. The printer dot gain, a major source of variability, changes the actual area of a printed dot. On line screens, this means the line widths become variable from printer to printer. However, this variation affects the lines in the foreground and the background in the same way and hence the foreground and background intensities should match regardless of the actual dot gain. This means that no calibration step is needed before printing the watermark. When screens other than lines are used, the foreground and background in general have a different ink perimeter, where the ink perimeter is defined to be the sum total in length of all ink/no-ink pixel boundaries. Because the dot gain effectively darkens a region in proportion to its ink perimeter, the foreground and background are not automatically matched in intensity for arbitrary dot gains. This problem is overcome by the use of line screens, thus obviating the need for calibration.

Figure 6:
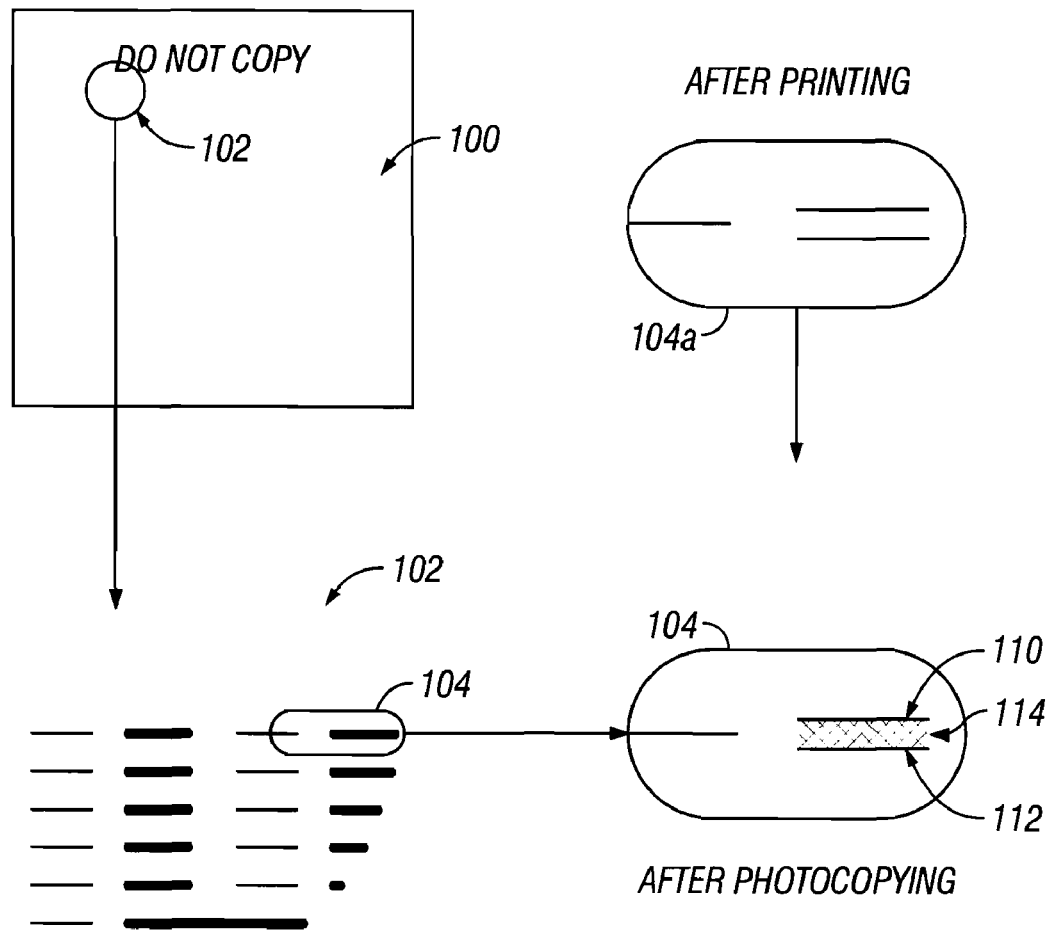
FIG. 6 is a diagram showing an exemplary printed page after photocopying according to the invention.

FIG. 6 is a diagram showing an exemplary printed page according to the invention after photocopying. In FIG. 6, a page 100 which is printed in accordance with the invention herein is photocopied, revealing a hidden message "Do Not Copy." A portion of the foreground and background 102 is shown in greater detail and consists of equally spaced lines that are readily resolved by a typical photocopier and lines that have been merged by the photocopier during the copying process due to insufficient spacing to be resolved as individual lines. A portion of the detail 104 is shown in greater detail to comprise first and second lines 110, 112, as contained in the original printed document (see 104a), and a portion 114 that was added by the photocopier due to the photocopier's inability to resolve both of the lines 110, 112 as individual lines. In this way, the foreground lines have greater perceptual intensity, and thus appear to stand out from the background.

Figure 7:
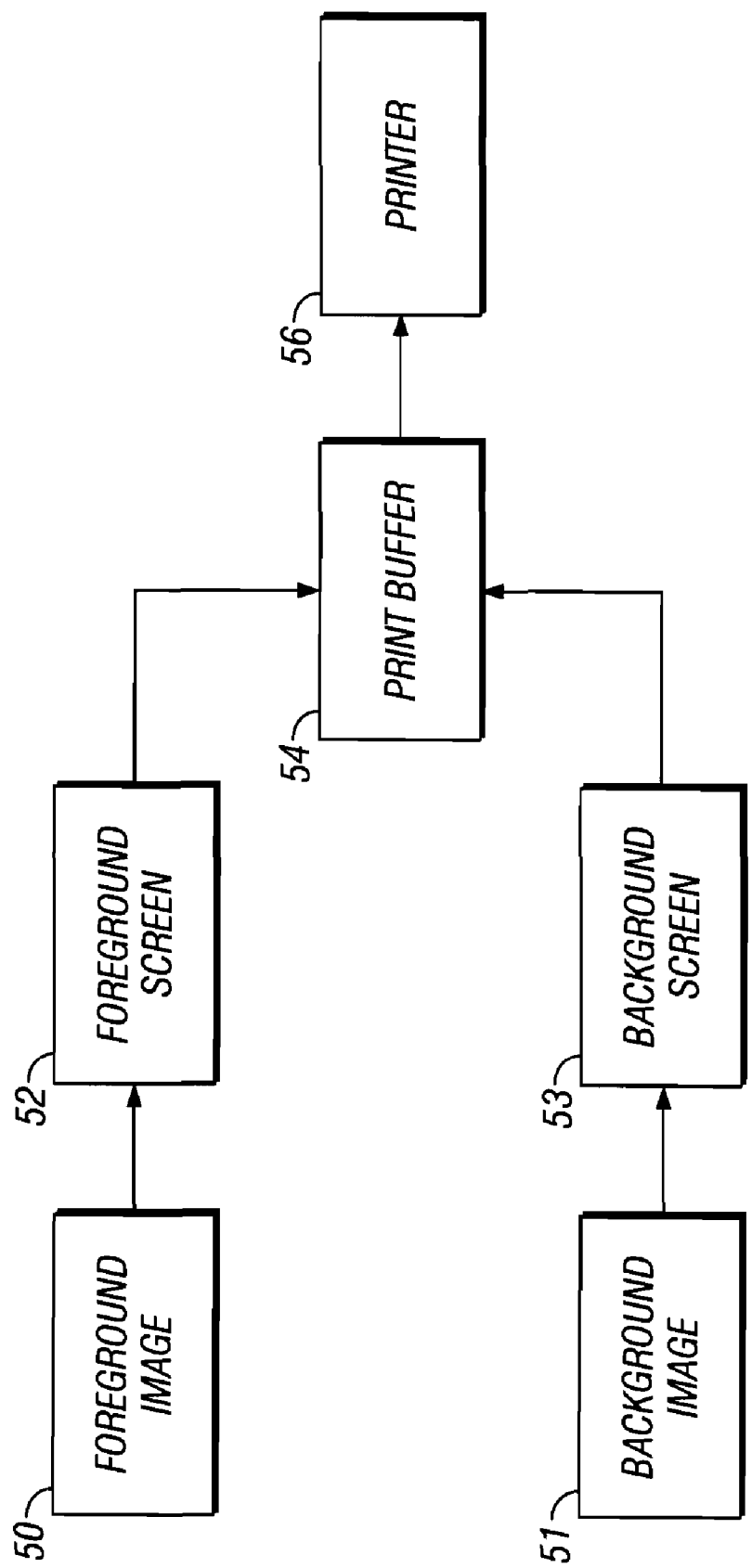
FIG. 7 is a block schematic diagram showing an exemplary mechanism for printing pages according to the invention.

FIG. 7 is a block schematic diagram showing a mechanism for printing pages in accordance with the invention. Foreground data 50, comprised of a hidden message, are processed with a foreground line screen 52. Background data 51 are processed with a background line screen 53. The line-screened foreground and background data are composited, for example in a print buffer 54, to produce a combined image for printing on a printer 56, as is known in the art.

Although the invention is described herein with reference to the preferred embodiment, one skilled in the art will readily appreciate that other applications may be substituted for those set forth herein without departing from the spirit and scope of the present invention. For example, the foreground and background screens can be interchanged. Further, straight lines in the screens can be replaced with, for example, curved lines. Accordingly, the invention should only be limited by the Claims included below.

The invention claimed is:

1. A method for printing a watermark in a document, the method comprising:
   generating foreground data comprising the watermark;
   generating background data;
   applying the foreground data to a first screen to produce a first screened image;
   applying the background data to a second screen to produce a second screened image wherein at least one of the first and second screens is a stochastic screen; and
   combining the first screened image and the second screened image for printing as a single image, wherein the foreground data are not visible on a first generation version of a document that is printed, and wherein the foreground data are readily apparent when the first generation document is photocopied.

2. The method of claim 1, the stochastic screens comprising any of a stochastic threshold screen and an error diffusion screen.

3. The method of claim 1, wherein:
   the stochastic screen comprises larger clustered dots with wider spacing between the dots; and
   the other stochastic screen comprises smaller clustered dots with narrower spacing between the dots.

4. The method of claim 1, wherein a discrepancy in reproducibility between the foreground image and the background image translates to a difference in their perceptual intensity, and renders a watermark easily visible on a photocopy.

5. Apparatus for printing a watermark in a document, the apparatus comprising:
   foreground data comprising the watermark;
   background data;
   a first screen for producing a foreground screened image;
   a second screen for producing a background screened image, wherein at least one of the first and second screens is a stochastic screen; and
   means for combining the foreground screened image and the background screened image for printing as a single image, wherein the foreground screened image is not visible on a first generation version of a document that is printed, and wherein the foreground screened image is readily apparent when the first generation document is photocopied.

6. The apparatus of claim 5, the stochastic screen comprising any of a stochastic threshold screen and an error diffusion screen.

7. The apparatus of claim 5, wherein a stochastic screen comprises larger clustered dots with wider spacing between the dots, and the other stochastic screen comprises smaller clustered dots with narrower spacing between the dots.

* * * * *